(12) United States Patent
Sakai

(10) Patent No.: US 11,461,056 B2
(45) Date of Patent: Oct. 4, 2022

(54) PRINTING DEVICE FOR PRINTING WHILE BEING MANUALLY MOVED, AND METHOD FOR PRODUCING PRINTED MATTER USING PRINTING DEVICE

(71) Applicant: SEIKO EPSON CORPORATION, Tokyo (JP)

(72) Inventor: Toshifumi Sakai, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/163,672

(22) Filed: Feb. 1, 2021

(65) Prior Publication Data
US 2021/0240409 A1 Aug. 5, 2021

(30) Foreign Application Priority Data
Feb. 3, 2020 (JP) .............................. JP2020-016062

(51) Int. Cl.
*G06F 3/12* (2006.01)
*G06K 15/10* (2006.01)

(52) U.S. Cl.
CPC .......... *G06F 3/1208* (2013.01); *G06F 3/1256* (2013.01); *G06K 15/102* (2013.01)

(58) Field of Classification Search
None
See application file for complete search history.

(56) References Cited

U.S. PATENT DOCUMENTS

| | | | | |
|---|---|---|---|---|
| 5,927,872 A | * | 7/1999 | Yamada | B41J 3/28 |
| | | | | 400/88 |
| 2007/0223982 A1 | * | 9/2007 | Miller | B41J 3/46 |
| | | | | 400/88 |
| 2008/0212120 A1 | * | 9/2008 | Mealy | H04N 1/107 |
| | | | | 358/1.12 |
| 2017/0266955 A1 | * | 9/2017 | Harada | B41J 3/46 |
| 2017/0274644 A1 | * | 9/2017 | Shinohara | B41J 11/0095 |
| 2017/0274691 A1 | * | 9/2017 | Nakahara | B41J 29/38 |
| 2018/0250947 A1 | | 9/2018 | Nakata et al. | |
| 2018/0250948 A1 | * | 9/2018 | Harada | B41J 2/1652 |
| 2018/0361761 A1 | | 12/2018 | Okeguchi et al. | |
| 2019/0092056 A1 | * | 3/2019 | Hirotani | B41J 3/36 |
| 2020/0062012 A1 | * | 2/2020 | Shinohara | B41J 3/36 |
| 2020/0101751 A1 | * | 4/2020 | Hirata | B41J 29/023 |
| 2020/0101763 A1 | * | 4/2020 | Ishida | B41J 2/17526 |
| 2020/0171867 A1 | * | 6/2020 | Hirotani | B41J 29/393 |

FOREIGN PATENT DOCUMENTS

| | | |
|---|---|---|
| JP | 2016-010969 A | 1/2016 |
| JP | 2018-021844 A | 2/2018 |
| JP | 2018-144338 A | 9/2018 |
| JP | 2019-001155 A | 1/2019 |

* cited by examiner

*Primary Examiner* — Henok Shiferaw
(74) *Attorney, Agent, or Firm* — Global IP Counselors, LLP

(57) ABSTRACT

A printing device that can print a print image at a planned printing position even without a user accurately aligning the printing device with the planned printing position is provided. The printing device automatically adjusts a printing position, based on scanned data obtained by scanning a medium via a medium scanning unit.

6 Claims, 19 Drawing Sheets

FIG. 6
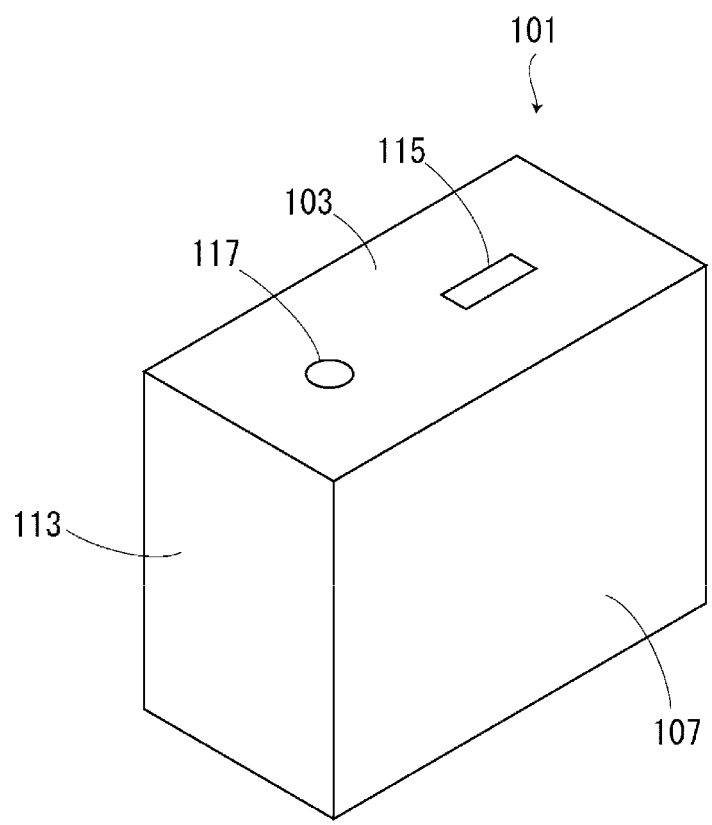
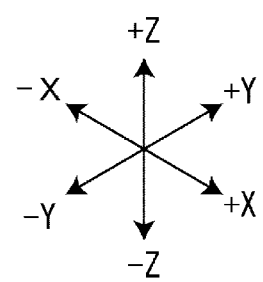

FIG. 10
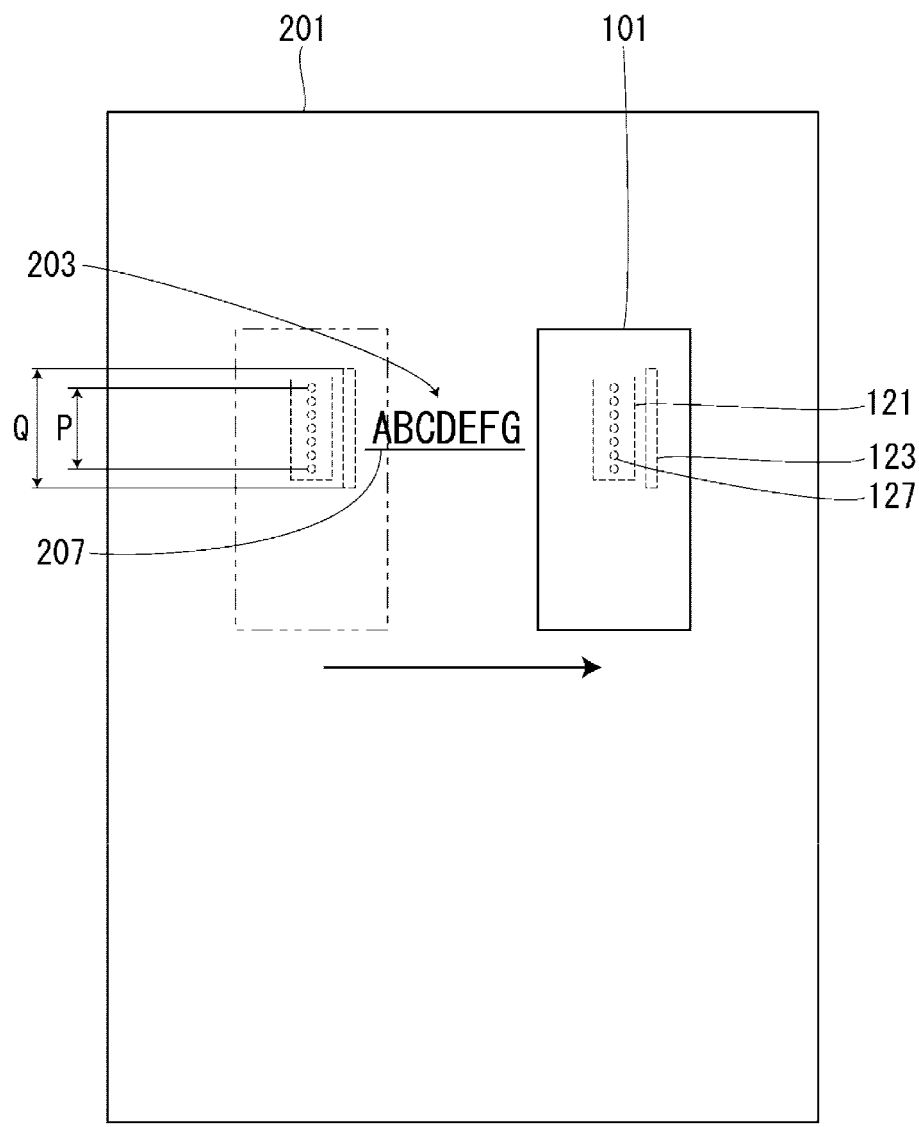
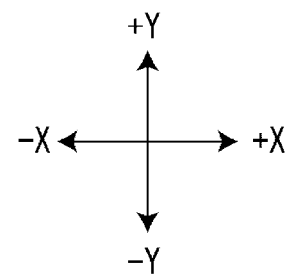

PRINTING DEVICE FOR PRINTING WHILE BEING MANUALLY MOVED, AND METHOD FOR PRODUCING PRINTED MATTER USING PRINTING DEVICE

The present application is based on, and claims priority from JP Application Serial Number 2020-016062, filed Feb. 3, 2020, the disclosure of which is hereby incorporated by reference herein in its entirety.

BACKGROUND

1. Technical Field

The present disclosure relates to a printing device printing on a medium while being manually moved in relation to the medium, a program, and a method for producing a printed matter.

2. Related Art

According to the related art, a handy mobile printer printing on a medium while being manually moved in relation to the medium (hereinafter referred to as a "handy printer") is known, as disclosed in JP-A-2019-001155. A user, before moving the handy printer, aligns the handy printer with a planned printing position, that is, a position where a print image is to be printed, using a guide member indicating a printing area of the handy printer.

For the handy printer according to the related art to print a print image without any misalignment with a planned printing position, the user needs to accurately align the handy printer with the planned printing position. Therefore, the handy printer according to the related art has a problem in that the alignment takes time and effort of the user and often fails.

SUMMARY

A printing device according to an aspect of the disclosure prints on a medium while being manually moved in relation to the medium. The printing device includes: a print information acquisition unit acquiring print data and mark information about a mark on the medium; a print head printing on the medium; a medium scanning unit scanning the medium; a mark detection unit detecting the mark represented by the mark information, based on scanned data, which is image data of the medium scanned by the medium scanning unit; and a head control unit controlling the print head in such a way that a print image based on the print data is printed at a position based on the mark that is detected, as a reference point.

A non-transitory computer-readable storage medium according to another aspect of the disclosure stores a program. The program causes a processor provided in an information processing device that can communicate with a printing device printing on a medium while being manually moved in relation to the medium, to function as: a medium data acquisition unit acquiring medium data representing the medium; a print data acquisition unit acquiring print data; and a transmission unit transmitting the print data and mark information about a specified mark to the printing device in response to an instruction given by a user to print.

A method for producing a printed matter according to still another aspect of the disclosure produces a printed matter using a printing device printing on a medium while being manually moved in relation to the medium. The method includes causing the printing device to execute: acquiring print data and mark information about a mark provided on the medium; scanning the medium; detecting the mark represented by the mark information, based on scanned data, which is image data of the medium that is scanned; and printing a print image based on the print data at a position based on the mark that is detected, as a reference point, and thus producing the printed matter.

BRIEF DESCRIPTION OF THE DRAWINGS

FIG. 6 is an external perspective view of a printing device.

FIG. 10 shows an available range of printing and an available range of scanning by the printing device.

DESCRIPTION OF EXEMPLARY EMBODIMENTS

An embodiment of a printing device, a program, and a method for producing a printed matter will now be described with reference to the accompanying drawings.

Printing System

Figure 1:
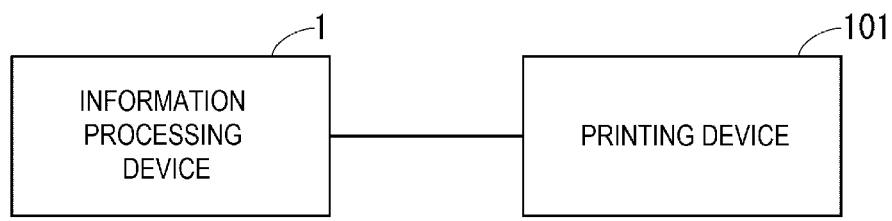
FIG. 1 is a block diagram of a printing system.

As shown in FIG. 1, a printing system Sy has an information processing device 1 and a printing device 101. The information processing device 1 and the printing device 101 are coupled in such a way as to be able to communicate via a wire or wirelessly.

The information processing device 1 transmits print data and mark information, described later, to the printing device 101. As the information processing device 1, for example, a smartphone, a tablet terminal, a personal computer or the like can be used.

Figure 2:
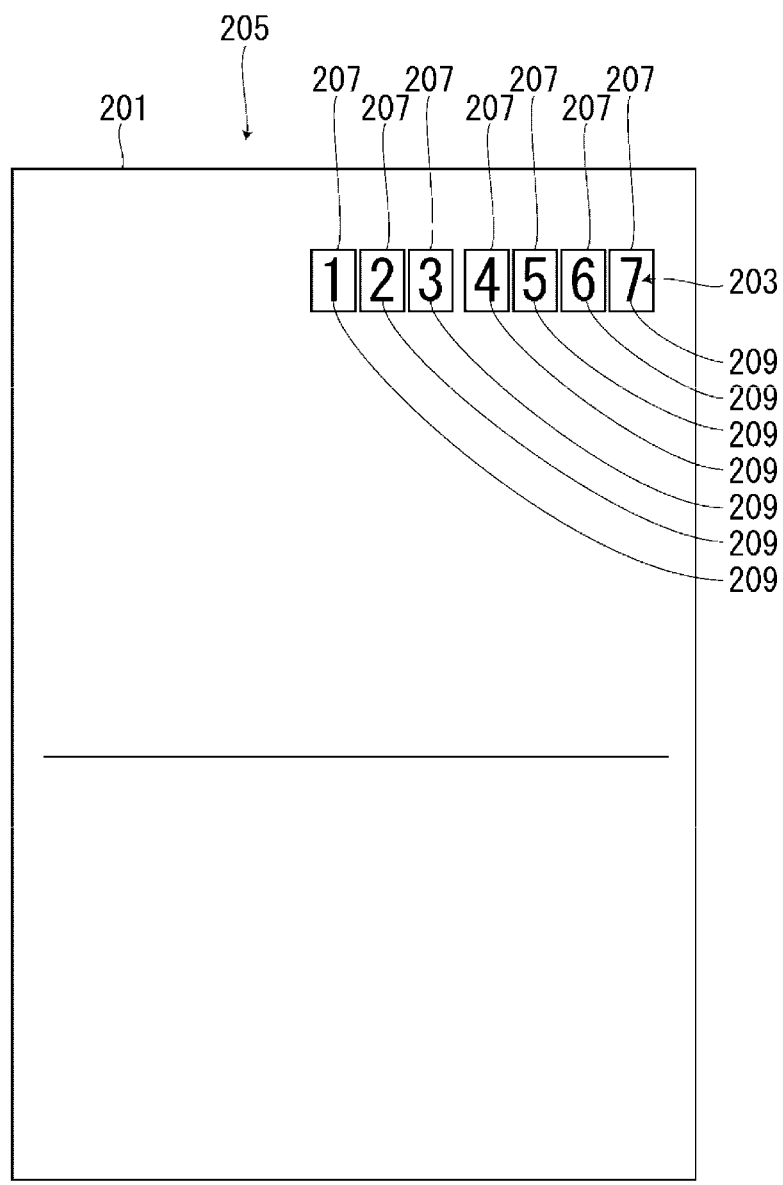
FIG. 2 shows an example of a printed part where a print image is printed on a medium provided with a mark.

The printing device 101 performs printing processing on a medium 201, based on the print data and the mark information received from the information processing device 1, and thus produces a printed matter 205, which is the medium 201 with a print image 203 printed thereon, as shown in FIG. 2. The printing device 101 is a so-called handy printer. The printing device 101 is manually moved in relation to the medium 201 and thus performs printing processing on the medium 201. The medium 201 is not limited to a print sheet. For example, an envelope, postcard, business card, cardboard, notebook sheet, CD (compact disc), clothes, bag or the like can be used, regardless whether it is paper or not.

Mark on Medium

Figure 3:
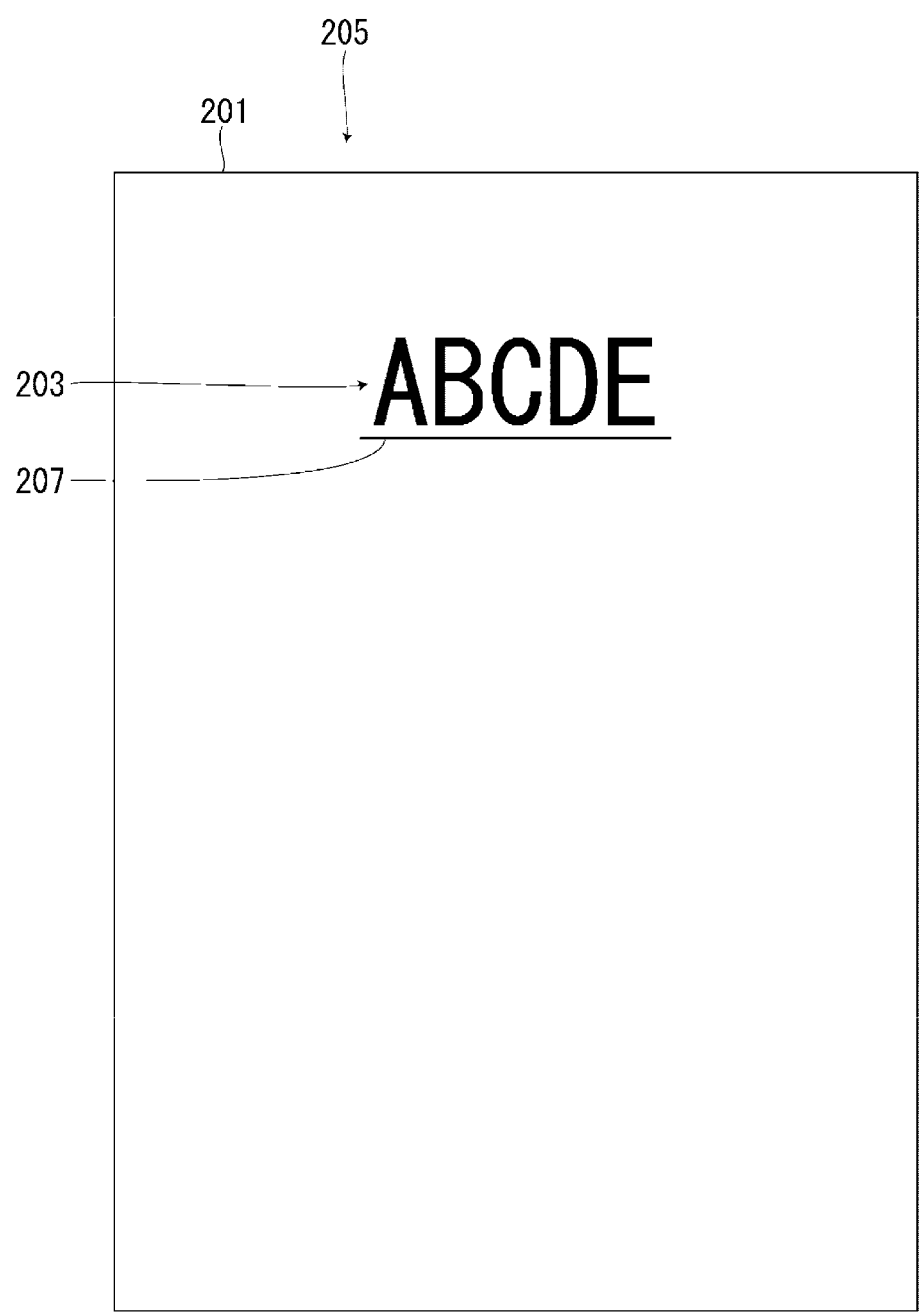
FIG. 3 shows an example of a printed part where a print image is printed on a medium provided with a mark.
Figure 4:
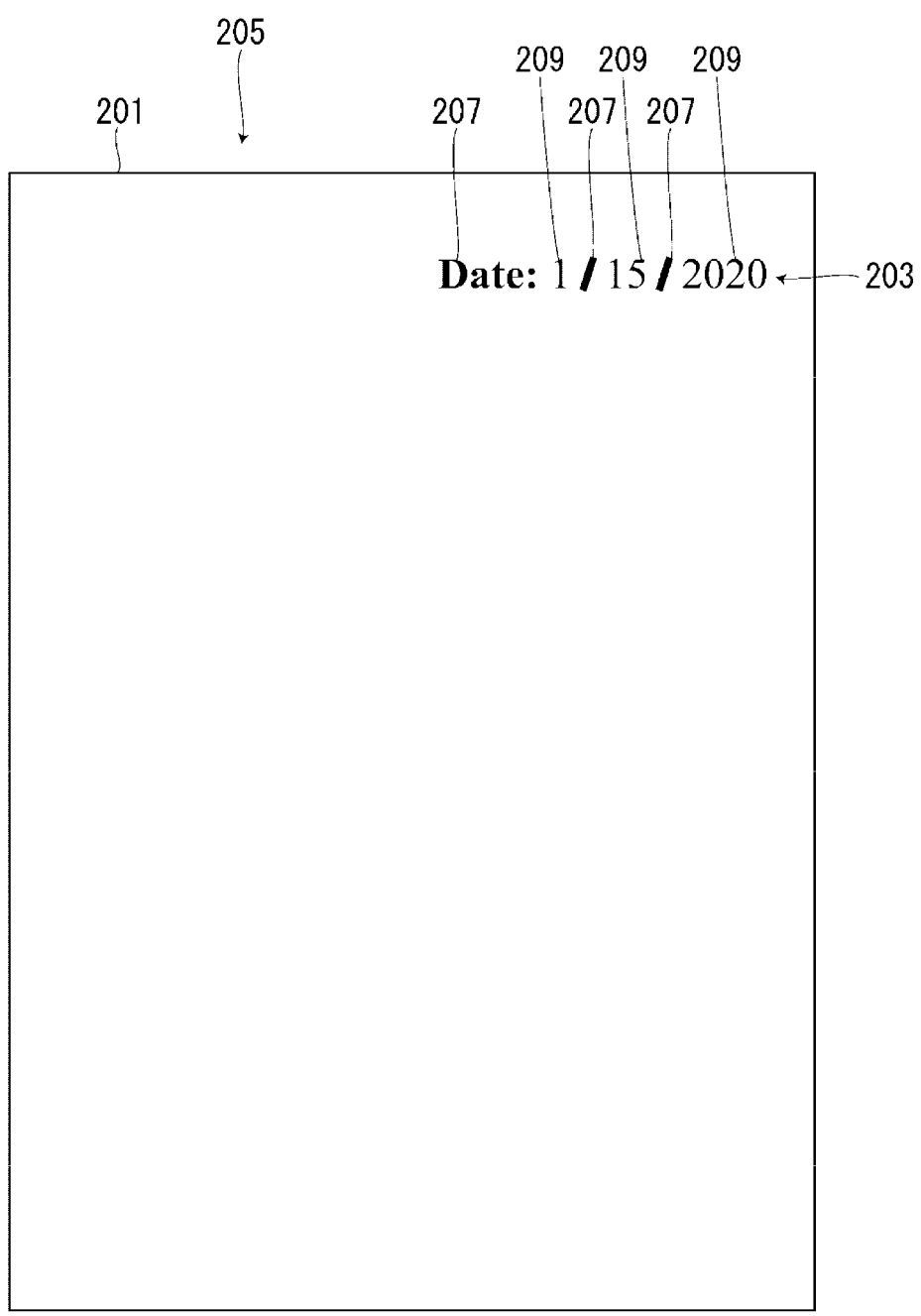
FIG. 4 shows an example of a printed part where a print image is printed on a medium provided with a mark.
Figure 5:
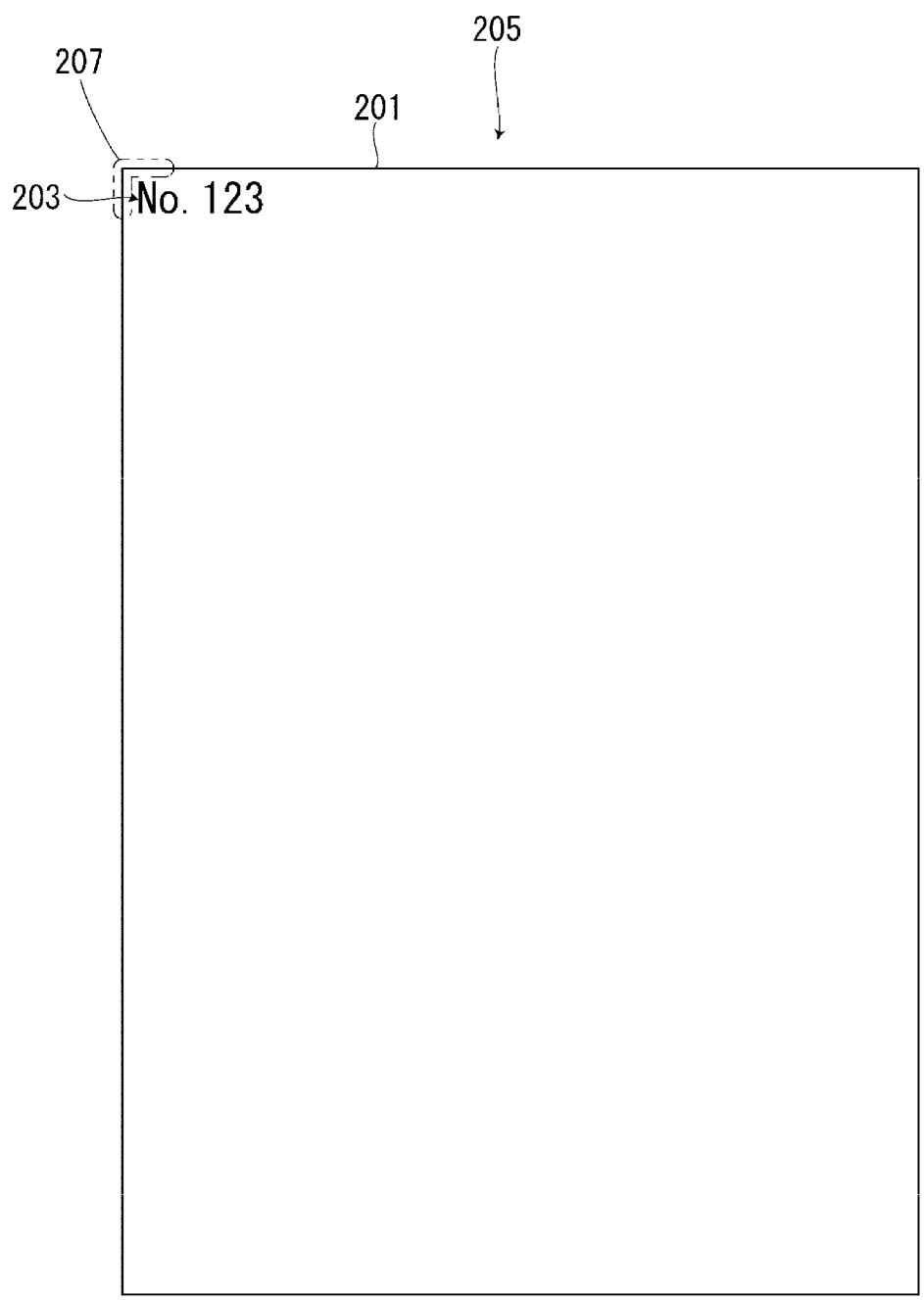
FIG. 5 shows an example of a printed part where a print image is printed on a medium provided with a mark.

A mark 207 provided on the medium 201 will now be described with reference to FIGS. 2 to 5. FIGS. 2 to 5 show an example of the result of printing on the medium 201 by the printing device 101. FIG. 2 shows an example where a postal code is printed on a postcard. FIG. 3 shows an example where a title is printed on a sheet of writing paper. FIG. 4 shows an example where a date is printed on a sheet of writing paper. FIG. 5 shows an example where a serial number is printed on a sheet of writing paper. As will be described in detail later, the printing device 101 prints the print image 203 at a position based on the mark 207 provided on the medium 201 as a reference point and thus can print the print image 203 at a planned printing position without a user 301 (see FIG. 8) having to accurately align the printing device 101 with the planned printing position. The planned printing position means a position where the user 301 plans to print the print image 203. On the medium 201 shown in FIG. 2, for example, the space within seven frames is the planned printing position.

The mark 207 functions as a reference point for the position where the print image 203 is to be printed. For example, a frame line (see FIG. 2), a ruled line (see FIG. 3) or a letter or symbol (see FIG. 4) provided on the medium 201, an edge of the medium 201 (see FIG. 5), or the like, can be the mark 207. In FIG. 4, in order to distinguish a letter serving as the mark 207, that is, a letter printed on the medium 201 in advance, from the print image 203, that is, a letter printed on the medium 201 by the printing device 101, the letter serving as the mark 207 is shown as a bold letter and the print image 203 is shown in a normal letter form. Which position on the medium 201 the mark 207 is located is specified for each medium 201 by the information processing device 1.

In FIG. 2, a plurality of frame lines provided on the medium 201 are specified as marks 207. When a plurality of marks 207 are specified in this way, a part corresponding to each mark 207 of the print image 203 is referred to as a partial image 209. In the example shown in FIG. 2, the partial image 209 corresponding to the first mark 207 from the left is a letter "1". The partial image 209 corresponding to the second mark 207 is a letter "2". The partial image 209 corresponding to the third mark 207 is a letter "3". The partial image 209 corresponding to the fourth mark 207 is a letter "4". The partial image 209 corresponding to the fifth mark 207 is a letter "5". The partial image 209 corresponding to the sixth mark 207 is a letter "6". The partial image 209 corresponding to the seventh mark 207 is a letter "7".

External Configuration of Printing Device

Figure 7:
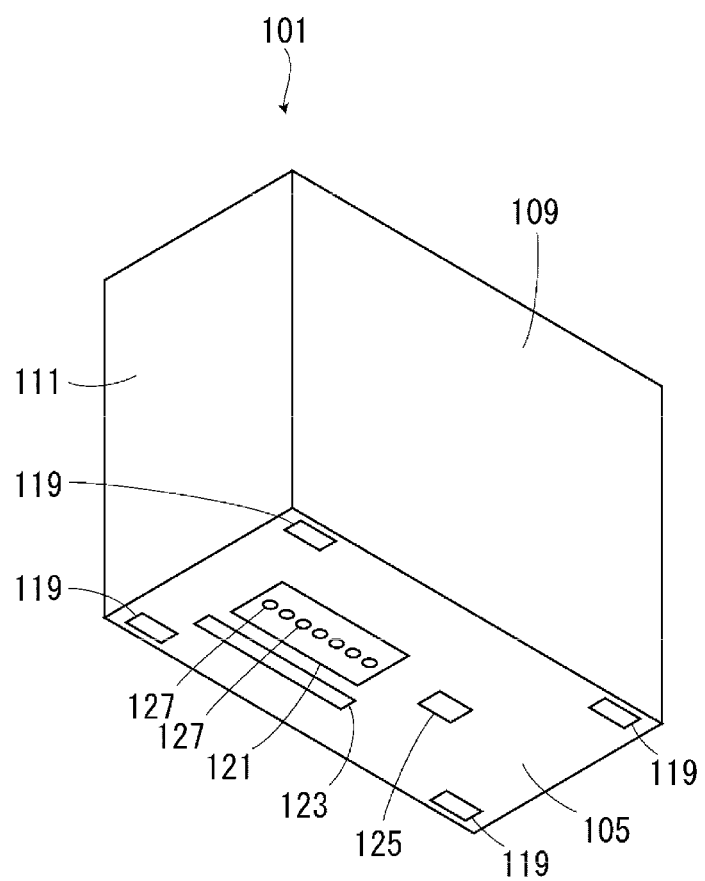
FIG. 7 is an external perspective view of the printing device as viewed from a different angle from FIG. 6.

The external configuration of the printing device 101 will now be described with reference to FIGS. 6 and 7. In the description below, a direction as viewed from the printing device 101 is described using a direction in an XYZ coordinate system illustrated in each drawing. However, such directions are solely for the sake of convenience of the description and should not limit the embodiment described below.

The printing device 101 is formed substantially in the shape of a rectangular parallelepiped. Of the six outer surfaces of the printing device 101, an outer surface where a print button 115, described later, is provided is referred to as a first outer surface 103. An outer surface opposite to the first outer surface 103 is referred to as a second outer surface 105. Of the four outer surfaces equivalent to the lateral surfaces when the first outer surface 103 or the second outer surface 105 is regarded as the bottom surface, one of the two outer surfaces having a large area is referred to as a third outer surface 107 and the other is referred to as a fourth outer surface 109. Also, of the four outer surfaces equivalent to the lateral surfaces, one of the two outer surfaces having a small area is referred to as a fifth outer surface 111 and the other is referred to as a sixth outer surface 113. That is, the first outer surface 103, the second outer surface 105, the third outer surface 107, the fourth outer surface 109, the fifth outer surface 111, and the sixth outer surface 113 are provided in a +Z direction, a −Z direction, a +X direction, a −X direction, a +Y direction, and a −Y direction, respectively, as viewed from the printing device 101.

At the first outer surface 103 of the printing device 101, the print button 115 and a power button 117 are provided.

The print button 115 accepts an instruction to start printing from the user 301. The print button 115 is provided in the +Y direction in relation to a center part of the first outer surface 103. The print button 115 is provided in the +Z direction in relation to a print head 121. That is, the print button 115 is provided at a position corresponding to the print head 121, on the first outer surface 103. The user 301 places the printing device 101 on the medium 201, subsequently presses the print button 115, then moves freehand the printing device 101 held in the hand along the surface of the medium 201, and thus can cause the printing device 101 to print the print image 203.

The power button 117 accepts an instruction to switch on or off the power from the user 301. The power button 117 is provided in the −Y direction in relation to the center part of the first outer surface 103.

At the second outer surface 105 of the printing device 101, a plurality of rollers 119, the print head 121, a medium scanning unit 123, and a movement detection signal output unit 125 are provided.

The plurality of rollers 119 slide in contact with the medium 201 to rotate and thus guide the movement of the printing device 101 in the X-direction in relation to the medium 201.

The print head 121 is an inkjet head having a plurality of nozzles 127. The print head 121 ejects ink from the plurality of nozzles 127 and thus prints the print image 203 on the medium 201. The print head 121 is provided in the +Y direction in relation to a center part of the second outer surface 105. That is, the print head 121 is provided in the −Z direction in relation to the print button 115. The plurality of nozzles 127 are arrayed in the Y-direction.

The medium scanning unit 123 scans the medium 201 while the printing device 101 is moved in relation to the medium 201. The printing device 101 detects the mark 207 provided on the medium 201, based on the result of the scan by the medium scanning unit 123. The medium scanning unit 123 scans an area located in the +X direction in relation to the print head 121, on the medium 201.

The movement detection signal output unit 125 is a sensor detecting a movement of the printing device 101. An output from the movement detection signal output unit 125 is referred to as a movement detection signal. The printing device 101 calculates a distance of movement of the printing device 101 in the X-direction and the Y-direction, based on the movement detection signal outputted from the movement detection signal output unit 125. The movement detection signal output unit 125 is provided in the −Y direction in relation to the print head 121.

Figure 8:
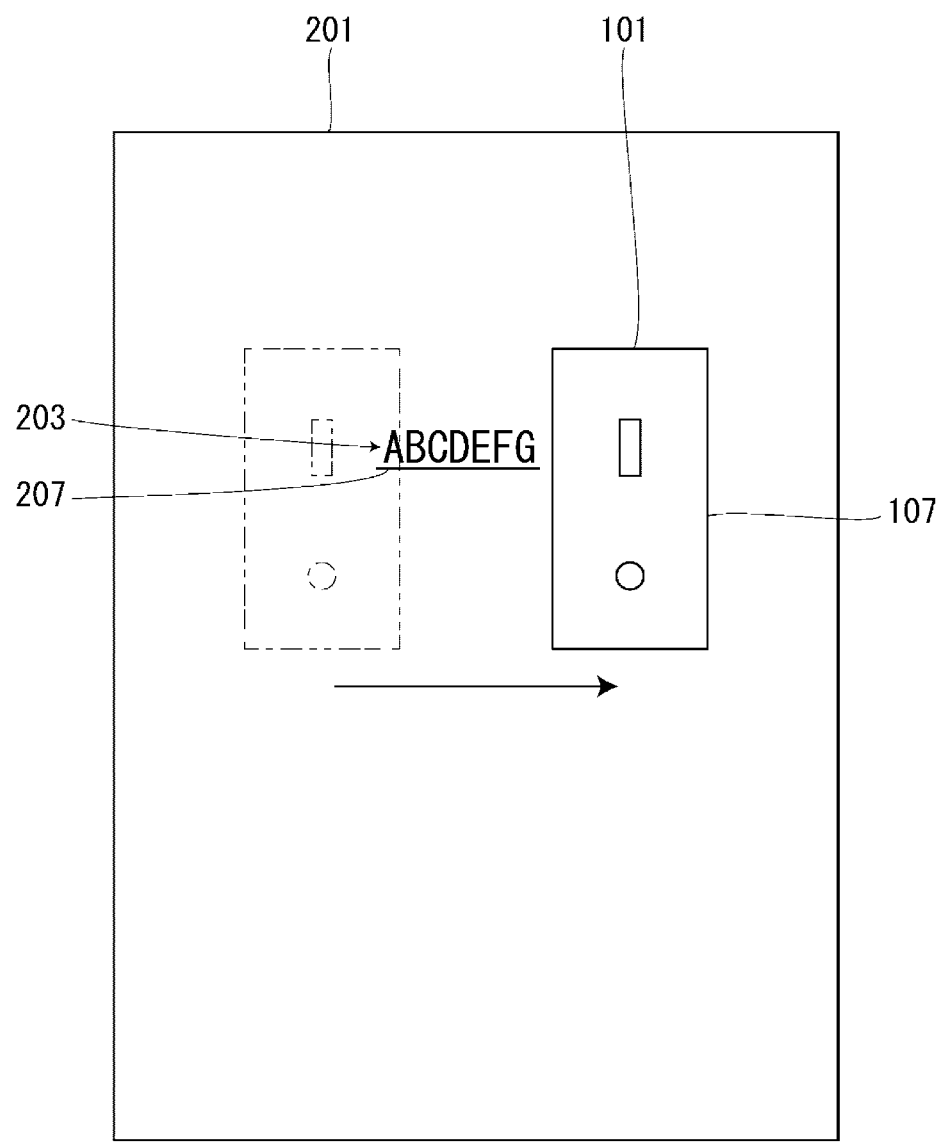
FIG. 8 shows a state where the printing device is moved in a +X direction as a result of a user moving the printing device to the right as viewed from the user.
Figure 9:
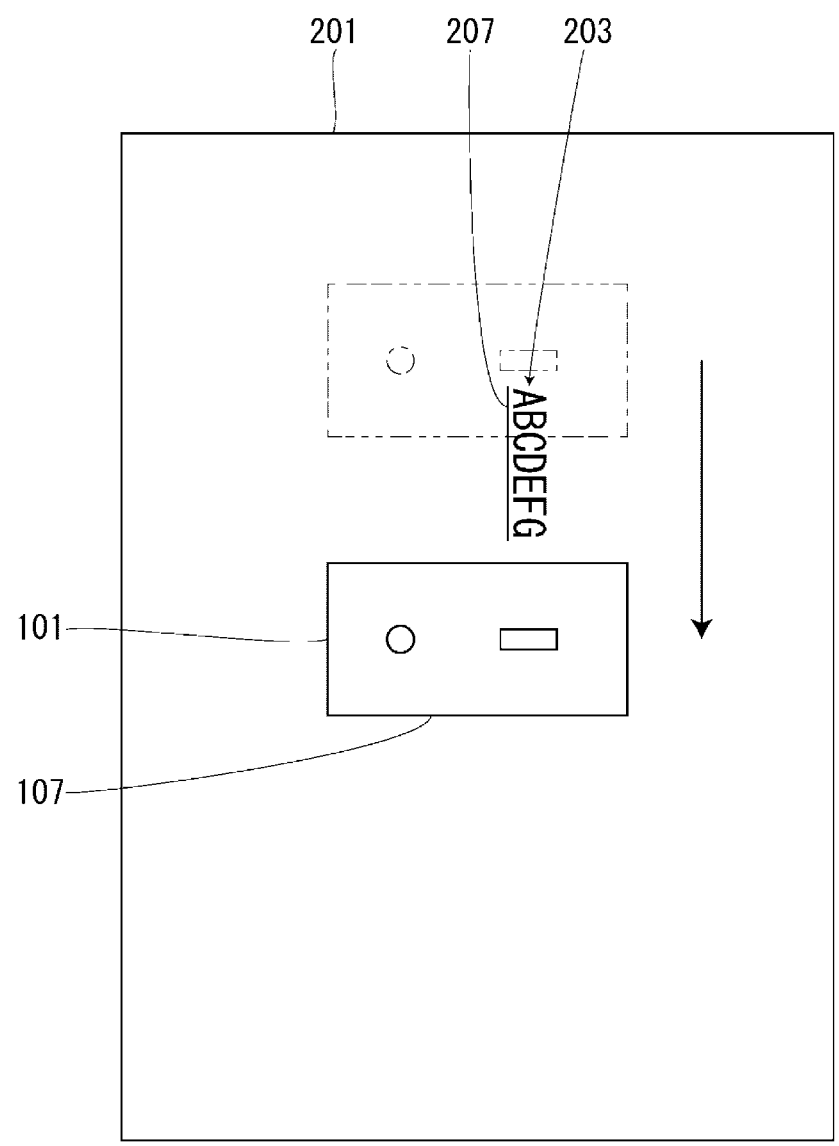
FIG. 9 shows a state where the printing device is moved in the +X direction as a result of the user moving the printing device to the front as viewed from the user.

The printing device 101 is moved in the +X direction as viewed from the printing device 101 and thus prints on the medium 201. That the printing device 101 is moved in the +X direction as viewed from the printing device 101 means that the printing device 101 is moved in such a way that the third outer surface 107 becomes the front face. For example, when the user 301 moves the printing device 101 to the right in the state where the third outer surface 107 faces to the right as viewed from the user 301, as shown in FIG. 8, the printing device 101 is moved in such a way that the third outer surface 107 becomes the front face. Therefore, the printing device 101 is moved in the +X direction as viewed from printing device 101. Also, when the user 301 moves the printing device 101 to the front in the state where the third outer surface 107 faces to the front as viewed from the user 301, as shown in FIG. 9, the printing device 101 is moved in such a way that the third outer surface 107 becomes the front face. Therefore, the printing device 101 is moved in the +X direction as viewed from printing device 101.

As described above, the medium scanning unit 123 scans the area located in the +X direction in relation to the print head 121, on the medium 201. Therefore, during the movement of the printing device 101 in the +X direction, the medium scanning unit 123 scans the mark 207 before the print head 121 reaches the mark 207, as shown in FIG. 10. Thus, the printing device 101 can print the print image 203 nearer to the end in the −X direction of the mark 207 along the X-direction, than in the configuration where the medium scanning unit 123 scans an area located in the −X direction, which is opposite to the +X direction, in relation to the print head 121. Although the medium scanning unit 123 is provided in the +X direction in relation to the print head 121, this is not limiting. For example, a configuration where the medium scanning unit 123 provided in the −X direction in relation to the print head 121 scans an area located in the +X direction in relation to the print head 121, by using a light guide member or the like, may be employed.

As shown in FIG. 10, in the Y-direction, that is, in a direction orthogonal to the +X direction, in which the printing device 101 is moved within the second outer surface 105 facing the medium 201, an available range of printing P by the print head 121 is located within an available range of scanning Q by the medium scanning unit 123. In other words, when projected in the +X direction, the available range of printing P by the print head 121 is located within the available range of scanning Q by the medium scanning unit 123. That is, in the Y-direction, the available range of printing P has a smaller dimension than the available range of scanning Q and no part of the available range of printing P extends out of the available range of scanning Q. Thus, the medium scanning unit 123 can scan the mark 207 located at substantially the same position as the position where the print image 203 is printed in the Y-direction while the printing device 101 is moved in the +X direction in relation to the medium 201. In this embodiment, the available range of printing P is equivalent to the length of the nozzle array formed by the plurality of nozzles 127. The available range of scanning Q is equivalent to the length of a scanning image sensor 137 (see FIG. 12), described later.

Hardware Configuration of Information Processing Device

Figure 11:
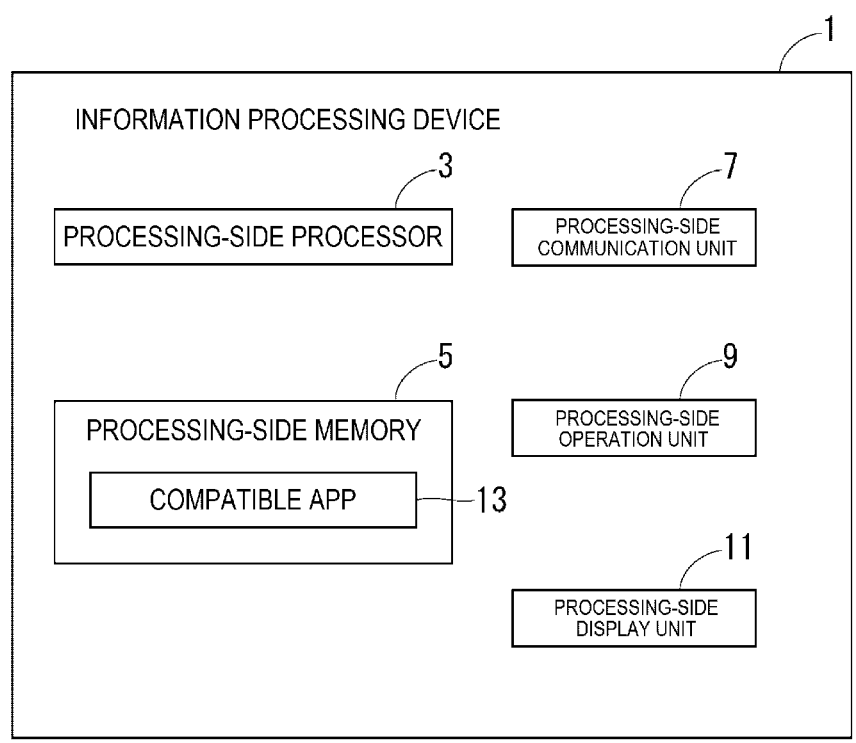
FIG. 11 is a block diagram showing the hardware configuration of an information processing device.

As shown in FIG. 11, the information processing device 1 has a processing-side processor 3, a processing-side memory 5, a processing-side communication unit 7, a processing-side operation unit 9, and a processing-side display unit 11.

The processing-side processor 3 executes various programs stored in the processing-side memory 5. The processing-side processor 3 is, for example, one or a plurality of CPUs (central processing units). The processing-side processor 3 may be a hardware circuit such as an ASIC (application-specific integrated circuit) or may be formed of one or more CPUs and a hardware circuit cooperating with each other to perform processing.

The processing-side memory 5 stores various programs and various data. The processing-side memory 5 has, for example, a ROM (read-only memory), a RAM (random-access memory), and an EEPROM (electrically erasable programmable read-only memory). The processing-side memory 5 may also have an HDD (hard disk drive), an SSD (solid-state drive), and the like.

The various programs stored in the processing-side memory 5 include a compatible app 13. The compatible app 13 is an application program compatible with the printing device 101. The processing-side processor 3 executes the compatible app 13 and thus executes printing control processing, described later.

The processing-side communication unit 7 transmits and receives various data and various commands to and from the printing device 101. The processing-side communication unit 7 has a communication circuit communicating with the printing device 101 via a wire or wirelessly.

The processing-side operation unit 9 accepts an operation by the user 301. As the processing-side operation unit 9, for example, a touch panel, a keyboard, a mouse or the like can be used.

The processing-side display unit 11 displays various screens. As the processing-side display unit 11, for example, a liquid crystal display or an organic EL (electroluminescence) display can be used.

Hardware Configuration of Printing Device

Figure 12:
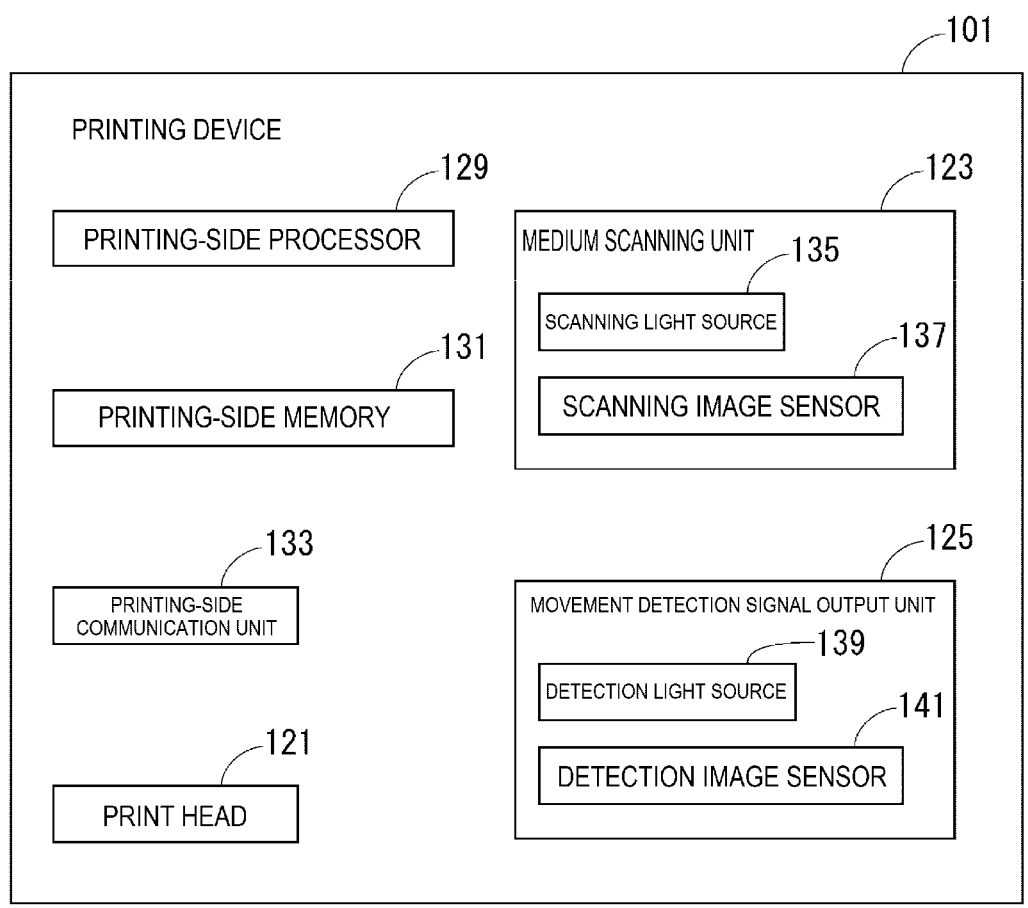
FIG. 12 is a block diagram showing the hardware configuration of the printing device.

As shown in FIG. 12, the printing device 101 has a printing-side processor 129, a printing-side memory 131, a printing-side communication unit 133, a medium scanning unit 123, a movement detection signal output unit 125, and the print head 121.

The printing-side processor 129 executes various programs stored in the printing-side memory 131. The printing-side processor 129 is, for example, one or a plurality of CPUs. The printing-side processor 129 may be a hardware circuit such as an ASIC or may be formed of one or more CPUs and a hardware circuit cooperating with each other to perform processing.

The printing-side memory 131 stores various programs and various data. The printing-side memory 131 has, for example, a ROM and a RAM. The printing-side memory 131 may also have an EEPROM, an HDD, an SSD, and the like.

The printing-side communication unit 133 transmits and receives various data and various commands to and from the information processing device 1. The printing-side communication unit 133 has a communication circuit communicating with the information processing device 1 via a wire or wirelessly.

The medium scanning unit 123 scans the medium 201 while the printing device 101 is moved in relation to the medium 201, and outputs image data of the medium 201 thus scanned, as scanned data. The medium scanning unit 123 has a scanning light source 135 and a scanning image sensor 137. The scanning light source 135 casts detection light onto the medium 201. As the scanning light source 135, for example, an LED (light-emitting diode), a semiconductor laser or the like can be used. The scanning image sensor 137 receives the detection light reflected by the medium 201 and generates image data based on the received detection light.

The medium scanning unit 123 scans the medium 201 in multiple colors. That is, the medium scanning unit 123 has scanning light sources 135 for the three colors of RGB, or has a scanning light source 135 for white light and color filters for the three colors of RGB. Thus, medium scanning unit 123 generates image data of the three colors of RGB as scanned data. Therefore, the medium scanning unit 123 can properly recognize the mark 207 regardless of the color of the mark 207.

The movement detection signal output unit 125 scans the medium 201 while the printing device 101 is moved in relation to the medium 201, and outputs image data of the medium 201 thus scanned, as a movement detection signal. The movement detection signal output unit 125 has a detection light source 139 and a detection image sensor 141. The detection light source 139 casts detection light onto the medium 201. As the detection light source 139, for example, an LED, a semiconductor laser or the like can be used. The detection image sensor 141 receives the detection light reflected by the medium 201 and generates image data based on the received detection light.

The movement detection signal output unit 125 scans the medium 201 in a single color. Therefore, the movement detection signal output unit 125 generates image data of a single color as a movement detection signal. Thus, the amount of data of the movement detection signal can be reduced. Also, the movement detection signal output unit 125 can be formed inexpensively.

The movement detection signal output unit 125 scans the medium 201 with a higher resolution than the medium scanning unit 123. An amount-of-movement calculation unit 147, described later, can calculate the amount of movement of the printing device 101 with high precision, based on the high-resolution movement detection signal resulting from the scanning by the movement detection signal output unit 125. The amount of movement in this embodiment is a set of a plurality of pieces of information about the movement. Specifically, the amount of movement is information including a distance over which the printing device 101 is moved in a first direction and a distance over which the printing device 101 is moved in a second direction during the movement of the printing device 101. Meanwhile, the medium scanning unit 123 scans the medium 201 with a lower resolution than the movement detection signal output unit 125. Therefore, the amount of data of the scanned data outputted from the medium scanning unit 123 can be reduced.

The printing-side processor 129 determines whether the printing device 101 is placed on the medium 201 or not, based on the scanned data outputted from the medium scanning unit 123 or the movement detection signal outputted from the movement detection signal output unit 125, after the print button 115 is pressed and until the printing processing is finished. When it is determined that the printing device 101 is not placed on the medium 201, the printing-side processor 129 cancels the printing processing, as error processing. Thus, the print head 121 is restrained from ejecting ink in the state where the print head 121 is not facing the medium 201. In this case, the printing device 101 may notify the user 103 or the information processing device 1 that the printing device 101 is not placed on the medium 201. When an edge of the medium 201 is specified as the mark 207 and the movement of the printing device 101 is started from outside the medium 201, the printing-side processor 129 does not cancel the printing processing until the mark 207 is detected, even when it is determined that the printing device 101 is not placed on the medium 201. Alternatively, the printing-side processor 129 may determine whether the printing device 101 is placed on the medium 201 or not, after the mark 207 is detected.

Functional Configuration of Information Processing Device

Figure 13:
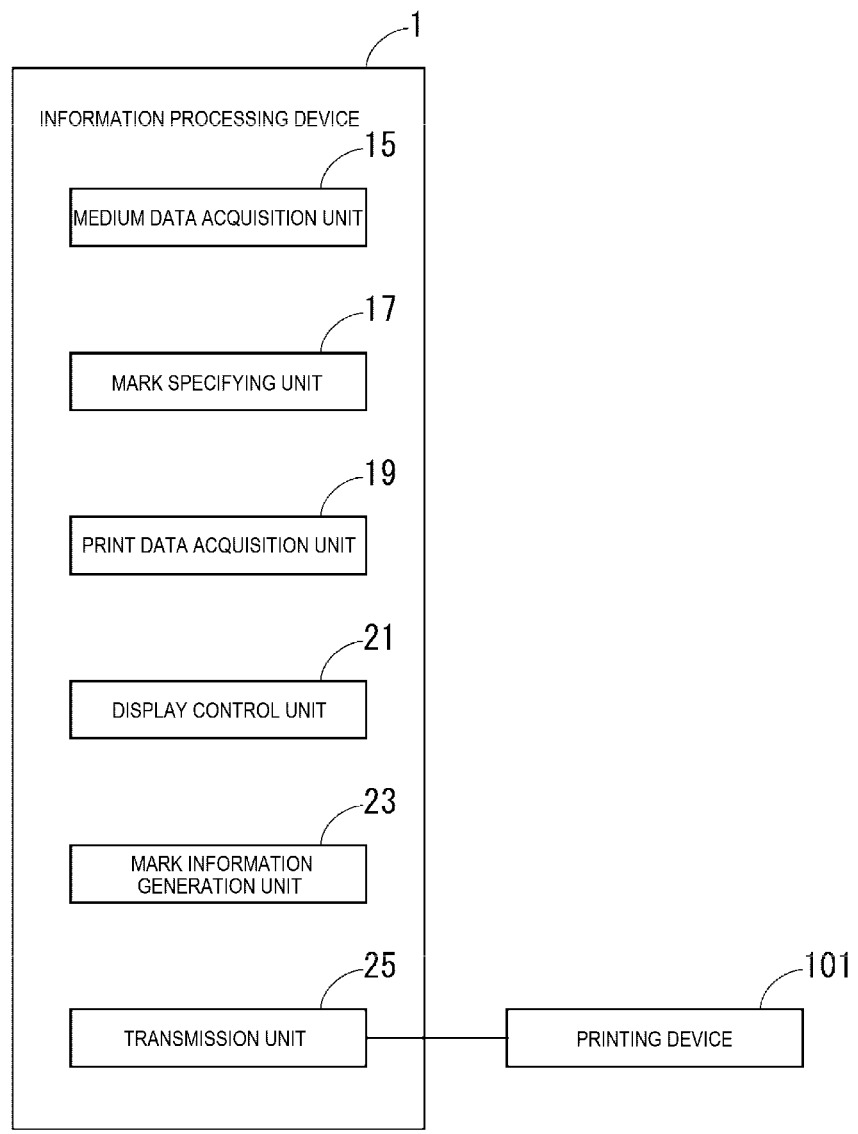
FIG. 13 is a block diagram showing the functional configuration of the information processing device.

The functional configuration of the information processing device 1 will now be described with reference to FIG. 13. The information processing device 1 has a medium data acquisition unit 15, a mark specifying unit 17, a print data acquisition unit 19, a display control unit 21, a mark information generation unit 23, and a transmission unit 25. These functional units are implemented by the processing-side processor 3 executing the compatible app 13.

The medium data acquisition unit 15 acquires medium data representing the medium 201. The medium data may be, for example, medium data prepared in advance as a template in the compatible app 13 or medium data obtained by scanning the medium 201 with a scanner or the information processing device 1 having a scanning function.

Figure 14:
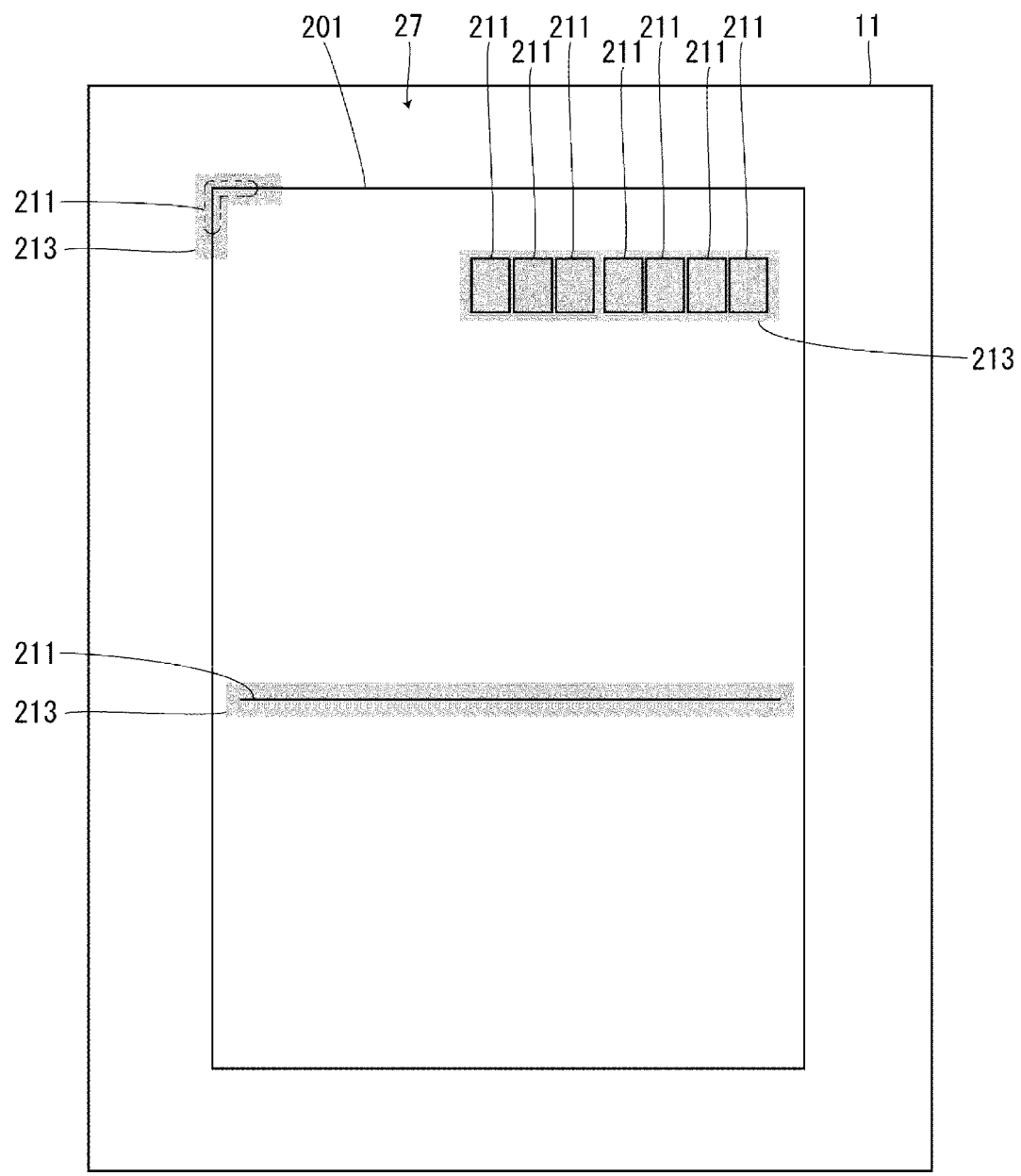
FIG. 14 shows a print preview where a medium is displayed.

The mark specifying unit 17 extracts a plurality of mark candidates 211 that can be the mark 207 from the medium data, as shown in FIG. 14. The mark specifying unit 17 may extract, as the mark candidate 211, a part that is determined as being able to be the mark 207 as a result of image analysis of the medium data, or may extract a part predetermined in the medium data, as the mark candidate 211.

The mark specifying unit 17 specifies the mark 207 from among the plurality of mark candidates 211 that are extracted, based on the positional relationship between each mark candidate 211 and the print image 203 in a print preview 27, described later. For example, the mark specifying unit 17 specifies, as the mark 207, the mark candidate 211 located in the direction of starting the printing of the print image 203 in relation to the print image 203 and nearest to the print image 203, from among the plurality of mark candidates 211. That the mark candidate 211 is located in the direction of starting the printing of the print image 203 means that at least part of the mark candidate 211 is located in the direction of starting the printing of the print image 203. In an example shown in FIG. 15, for example, with respect to the letter "2" of the seven partial images 209, the mark specifying unit 17 extracts three parts, that is, the top left edge of the medium 201, the first frame line from the left of the seven frame lines, and the second frame line, as mark candidates 211 located in the direction of starting the printing of the letter "2", that is, located to the left, from among the plurality of mark candidates 211. The mark specifying unit 17 then specifies the mark candidate 211 nearest to the letter "2", that is, the second frame line from the left of the seven frame lines, from among the three mark candidates 211, as the mark 207 for the letter "2". The mark 207 is similarly specified for the other partial images 209. Thus, the medium scanning unit 123 can scan the mark 207 before the print head 121 prints the print image 203. Also, the distance of movement of the printing device 101 before starting printing can be reduced.

The print data acquisition unit 19 acquires print data for the printing device 101 to print the print image 203. The print data may be, for example, data based on an input operation to input a letter or the like to the information processing device 1, picked-up image data picked up by the information processing device 1 having an image pickup function, or data received by the information processing device 1 from another device.

Figure 15:
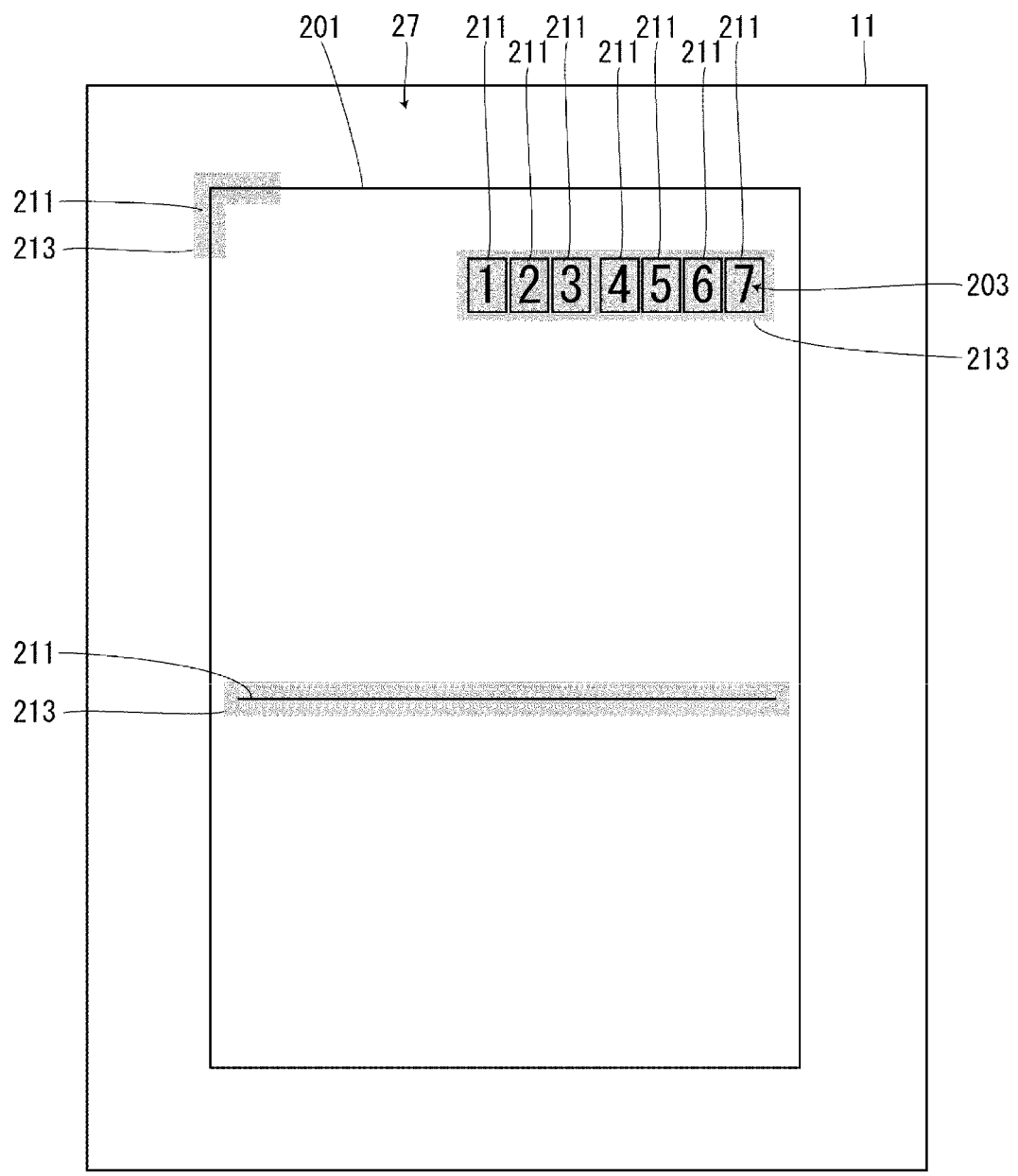
FIG. 15 shows a print preview where a medium and a print image are displayed.

The display control unit 21 controls the processing-side display unit 11 in such a way that the processing-side display unit 11 displays the print preview 27, based on the medium data and the print data. The print preview 27 shows a sample image of the medium 201, as shown in FIG. 14. The print preview 27 also shows a sample image of the print image 203 printed on the medium 201, as superimposed on the medium 201, as shown in FIG. 15. The sample image of the medium 201 and the sample image of the print image 203 are initially displayed in a default layout, that is, in a size and relative position according to a predetermined criterion.

The display control unit 21 controls the processing-side display unit 11 in such a way that the mark candidate 211 specified by the mark specifying unit 17 is highlighted to be displayed in the print preview 27. Thus, the mark candidate 211 can be made more visible to the user 301. As a way of highlighting the mark candidate 211 in the print preview 27, FIGS. 14 and 15 show the state where the mark candidate 211 is highlighted by hatching 213. However, this is not limiting. For example, the mark candidate 211 may be highlighted by flashing on and off.

The display control unit 21 changes the display position of the print image 203 in relation to the medium 201 in the print preview 27, based on a change operation to change the position of the print image 203 in relation to the medium 201. The change operation is, for example, the operation of selecting the print image 203 and dragging or wheeling with a mouse, or the operation of inputting, with a keyboard, the numeric value of a coordinate or angle at which the print image 203 is to be arranged. To move the printing device 101 to the right as viewed from the user 301 when printing, the user 301 may arrange the print image 203 to the right of the mark 207 and near the mark 207 in the print preview 27. Thus, the medium scanning unit 123 can scan the mark 207 before the print head 121 prints the print image 203. Also, the distance of movement of the printing device 101 before starting printing can be reduced.

The mark information generation unit 23 generates mark information about the mark 207 specified by the mark specifying unit 17. The mark information includes mark image information and mark position information.

The mark image information is information representing the shape and color of the mark 207. The mark information generation unit 23 extracts the mark 207 specified by the mark specifying unit 17 from the medium data and thus generates the mark image information.

The mark position information is information representing the relative positional relationship between the mark 207 and the print image 203 on the medium 201. For example, the mark position information is information representing that the reference position of the print image 203 is located x millimeters to the right of and y millimeters above the reference position of the mark 207 on the medium 201. In this example, x and y may be any of positive numbers, 0, and negative numbers. To explain an example more specifically, the mark position information is information representing the position of the origin of the print image 203, using the coordinate axis of the mark image information and based on the origin in the image data of the mark image information. The mark image information is generated in such a way that the coordinate axis of the mark image information becomes parallel to the coordinate axis of the print image 203. Therefore, the angle thereof does not matter. However, when the angle is not constant between the two coordinate axes, the mark position information needs to include the angle. The mark information generation unit 23 generates the mark position information, based on medium size information and the positional relationship between the mark 207 and the print image 203 in the print preview 27. The medium size information is information representing the size of the medium 201 and is included, for example, in the medium data.

The transmission unit 25 transmits the print data acquired by the print data acquisition unit 19 and the mark information generated by the mark information generation unit 23 to the printing device 101.

Functional Configuration of Printing Device

Figure 16:
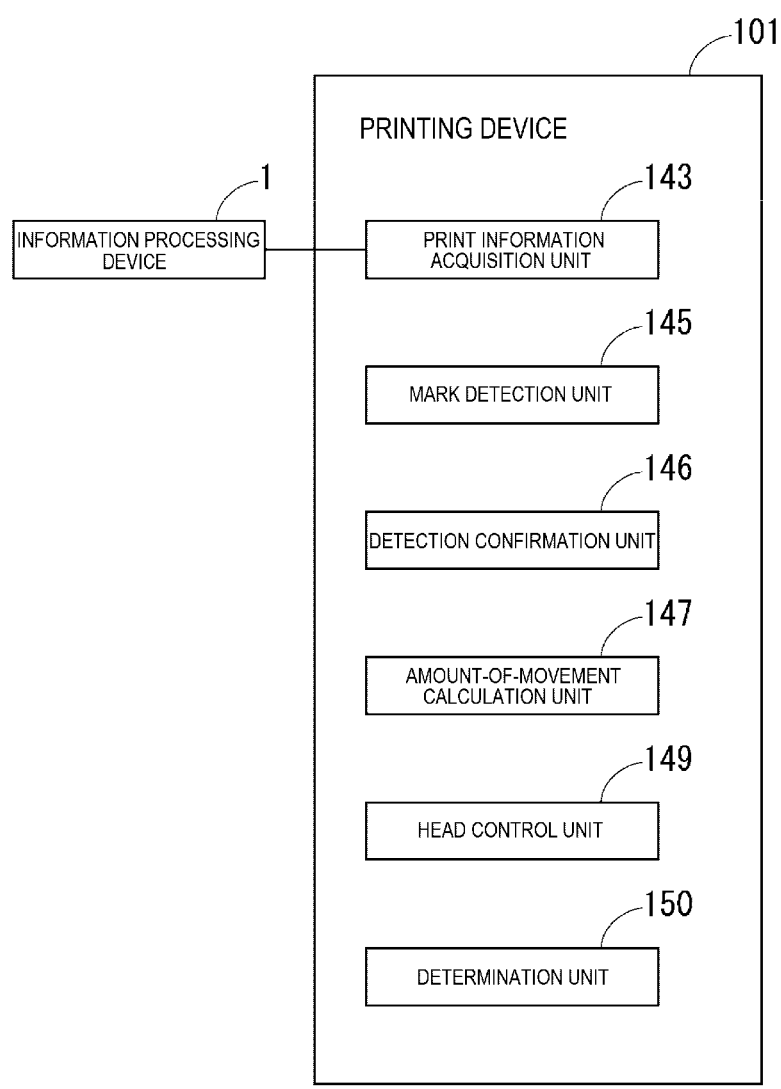
FIG. 16 is a block diagram showing the functional configuration of the printing device.

The functional configuration of the printing device 101 will now be described with reference to FIG. 16. The printing device 101 has a print information acquisition unit 143, a mark detection unit 145, a detection confirmation unit 146, an amount-of-movement calculation unit 147, a head control unit 149, and a determination unit 150. These functional units are implemented by the printing-side processor 129 executing a program stored in the printing-side memory 131.

The print information acquisition unit 143 acquires print data and mark information transmitted from the information processing device 1.

The mark detection unit 145 performs image analysis of scanned data outputted from the medium scanning unit 123, that is, image data of the medium 201, and thus detects the mark 207 represented by mark image information included in the mark information.

The detection confirmation unit 146 confirms whether the mark detection unit 145 has detected the mark 207 or not.

The amount-of-movement calculation unit 147 calculates the amount of movement of the printing device 101, based on a movement detection signal outputted from the movement detection signal output unit 125, that is, image data of the medium 201. That is, the amount-of-movement calculation unit 147 compares image data of the medium 201 acquired $t_1$ seconds after the start of the movement with image data of the medium 201 acquired $t_2$ seconds after the start of the movement, where $t_2>t_1$, and thus calculates the amount of movement of the printing device 101 during a period of $(t_2-t_1)$ seconds.

The head control unit 149 controls the print head 121 in such a way that the print image 203 is printed at a position based on the mark 207 as a reference point. The head control unit 149 calculates the relative position of the print head 121 to the detected mark 207 and corrects the print data, based on the calculated relative position of the print head 121. For example, the head control unit 149 corrects the print data in the Y-direction, based on the amount of misalignment of the print head 121 in relation to the mark 207 in the Y-direction. The head control unit 149 also corrects the print data in a θ-direction, which is the direction of rotation within the XY plane, based on the amount of misalignment of the print head 121 in relation to the mark 207 in the θ-direction. The head control unit 149 then determines whether or not the print head 121 has reached a printing start position that is set based on the mark position information included in the mark information, after the mark 207 is detected. When it is determined that the print head 121 has reached the printing start position, the head control unit 149 causes the print head 121 to start printing, based on the corrected print data. The head control unit 149 determines whether the print head 121 has reached the printing start position or not, based on whether the amount of movement of the printing device 101 from the mark 207 calculated by the amount-of-movement calculation unit 147 has reached the amount of movement based on the mark position information or not.

The head control unit 149 also controls the timing of ejecting ink from the nozzle 127, based on the amount of movement of the printing device 101 calculated by the amount-of-movement calculation unit 147, after the printing is started. Thus, the printing device 101 can properly print the print image 203 on the medium 201 regardless of the speed at which the user 301 moves the printing device 101.

The determination unit 150 determines whether the printing of the partial image 209 is finished or not. The determination unit 150 also determines whether there is an unprinted partial image 209 or not.

Printing Control Processing

Figure 17:
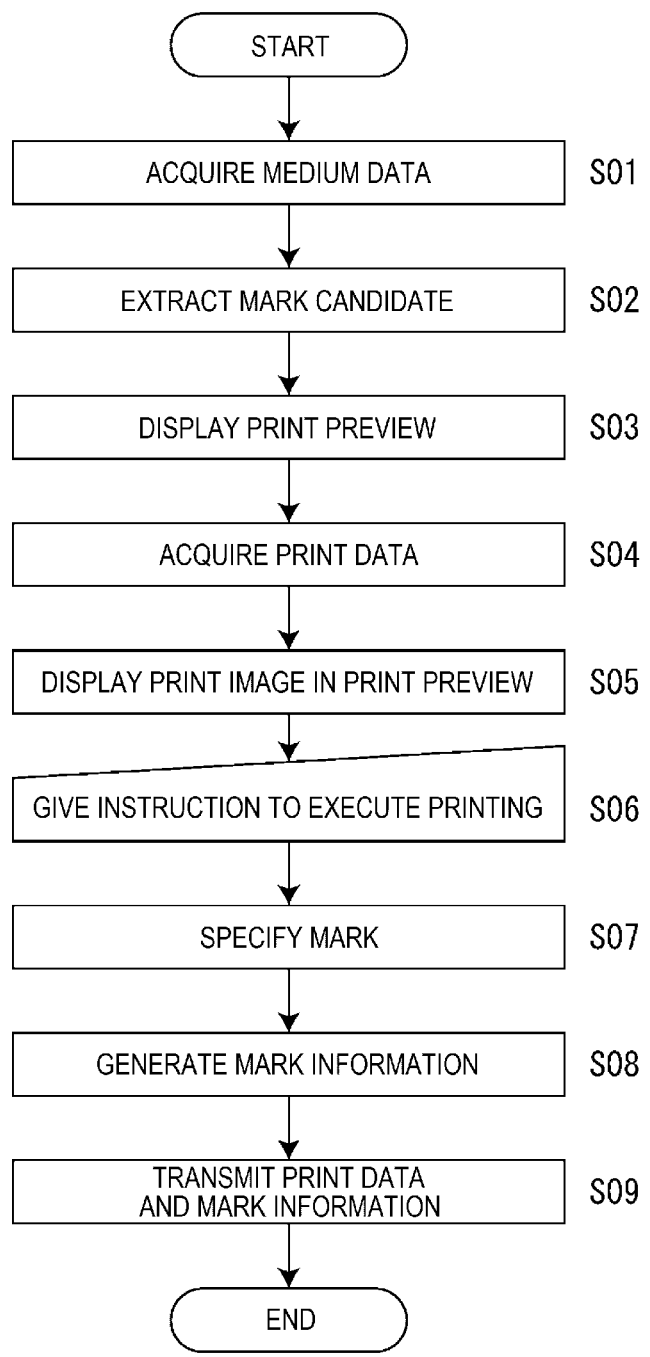
FIG. 17 is a flowchart showing printing control processing executed by the information processing device.

The printing control processing executed by the information processing device 1 will now be described with reference to FIG. 17.

In step S01, the information processing device 1 acquires medium data via the medium data acquisition unit 15.

In step S02, the information processing device 1 extracts a plurality of mark candidates 211 from the medium data via the mark specifying unit 17.

In step S03, the information processing device 1 causes the processing-side display unit 11 to display the print preview 27, as shown in FIG. 14, via the display control unit 21. The print preview 27 shows a sample image of the medium 201 in a way that highlights the plurality of mark candidates 211 that are extracted.

In step S04, the information processing device 1 acquires print data via the print data acquisition unit 19.

In step S05, the information processing device 1 displays the print image 203 based on the print data as superimposed on the medium 201 in the print preview 27, as shown in FIG. 15, via the display control unit 21. The information processing device 1 also changes, via the display control unit 21, the display position and size of the print image 203 in relation to the medium 201 in the print preview 27, based on an operation to change the position and size of the print image 203 in relation to the medium 201.

When the user 301 gives an instruction to execute printing in step S06, the information processing device 1 proceeds to step S07.

In step S07, the information processing device 1 specifies the mark 207 from among the plurality of mark candidates 211 that are extracted, based on the positional relationship between each mark candidate 211 and the print image 203 in the print preview 27, via the mark specifying unit 17.

In step S08, the information processing device 1 generates mark information about the mark 207 specified in step S07, via the mark information generation unit 23.

In step S09, the information processing device 1 transmits the print data acquired in step S04 and the mark information generated in step S08 to the printing device 101 via the transmission unit 25.

Printing Processing

Figure 18:
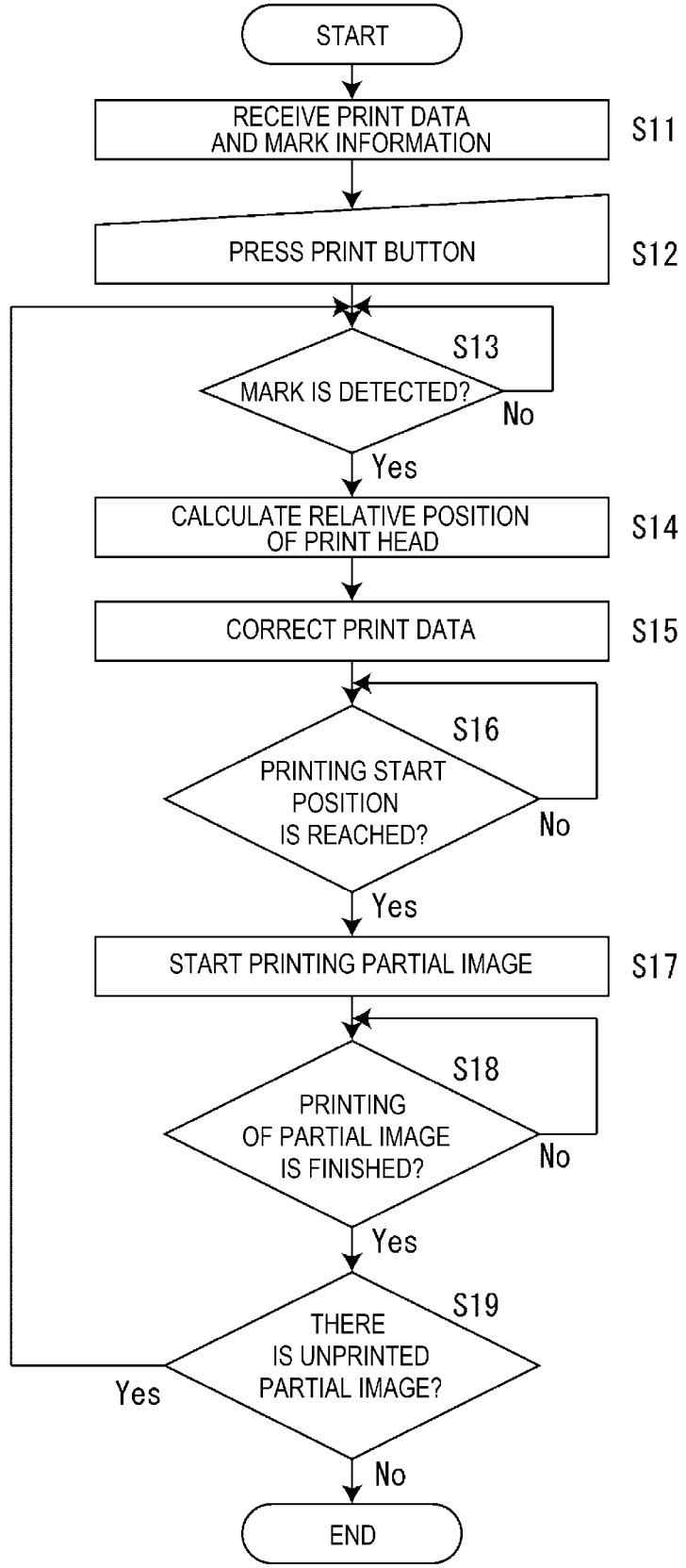
FIG. 18 is a flowchart showing printing processing executed by the printing device.

The printing processing executed by the printing device 101 will now be described with reference to FIG. 18.

In step S11, the printing device 101 acquires, via the print information acquisition unit 143, the print data and the mark information transmitted from the information processing device 1.

When the user 301 presses the print button 115 in step S12, the printing device 101 proceeds to step S13.

In step S13, the printing device 101 confirms, via the detection confirmation unit 146, whether or not the mark detection unit 145 has detected the mark 207 corresponding to the partial image 209 that is about to be printed. When it is determined that the mark detection unit 145 has not detected the mark 207, the printing device 101 repeats step S13 until it is determined that the mark detection unit 145 has detected the mark 207. When the mark 207 is not detected even with the lapse of a predetermined time after the print button 115 is pressed or after the movement of the printing device 101 is started, the printing device 101 may notify the user 301 of an error because there is a risk that the printing device 101 may be being moved at a position where the printing device 101 cannot scan the mark 207.

Meanwhile, when it is determined in step S13 that the mark detection unit 145 has detected the mark 207, the printing device 101 proceeds to step S14.

In step S14, the printing device 101 calculates the relative position of the print head 121 to the detected mark 207, via the head control unit 149.

In step S15, the printing device 101 corrects the print data of the partial image 209 corresponding to the detected mark 207, based on the calculated relative position of the print head 121, via the head control unit 149.

In step S16, the printing device 101 determines, via the head control unit 149, whether the print head 121 has reached the printing start position or not. When it is determined that the print head 121 has not reached the printing start position, the printing device 101 repeats step S16 until it is determined that the print head 121 has reached the printing start position.

Meanwhile, when it is determined in step S16 that the print head 121 has reached the printing start position, the printing device 101 proceeds to step S17.

In step S17, the printing device 101 controls, via the head control unit 149, the print head 121 based on the corrected print data and causes the print head 121 to start printing the partial image 209 corresponding to the detected mark 207.

In step S18, the printing device 101 determines whether the printing of the partial image 209 is finished or not, via the determination unit 150. When it is determined that the printing of the partial image 209 is not finished, the printing device 101 repeats step S18 until it is determined that the printing of the partial image 209 is finished.

Meanwhile, when it is determined in step S18 that the printing of the partial image 209 is finished, the printing device 101 proceeds to step S19.

In step S19, the printing device 101 determines whether there is an unprinted partial image 209 or not, via the determination unit 150. When it is determined that there is an unprinted partial image 209, the printing device 101 returns to step S13. For example, when there are seven marks 207 and seven partial images 209 corresponding to the marks 207, as shown in FIG. 2, the printing device 101 repeatedly performs steps S13 to S19 seven times.

Meanwhile, when it is determined in step S19 that there is no unprinted partial image 209, the printing device 101 ends the printing processing.

As described above, the printing device 101 in this embodiment can print the print image 203 at a planned printing position even without the user 301 accurately aligning the printing device 101 with the planned printing position. That is, the user 301 can simply place the printing device 101 at a position approximate to the planned printing position. Then, the printing device 101 scans the mark 207 and prints the print image 203 at a position corresponding to the scanned mark 207. Thus, the print image 203 is printed at the planned printing position. The compatible app 13 in this embodiment can provide the printing device 101 with necessary information for printing the print image 203 at the planned printing position. The method for producing the printed matter 205 in this embodiment can easily produce the printed matter 205 with the print image 203 printed at the planned printing position.

Other Modification Examples

The disclosure is not limited to the above embodiment and can employ various configurations without departing from the spirit and scope of the disclosure. Each element of the embodiment may be implemented by a plurality of components. Also, a plurality of elements may be implemented by one component. A part of the functions of the information processing device 1 may be provided at a server on a network, and a computer which the user has at hand and the server may cooperate with each other to implement the information processing device 1. The embodiment can be changed, for example, to configurations as described below, as well as those described above.

The medium scanning unit 123 is not limited to being configured to scan the area located in the +X direction in relation to the print head 121, on the medium 201. The medium scanning unit 123 may simply be able to scan the mark 207 before the print head 121 reaches the printing start position. For example, the medium scanning unit 123 may be configured to scan an area located in the −X direction in relation to the print head 121.

The printing device 101 may be configured to be able to print not only while being moved in the +X direction but also while being moved in the −X direction. In this case, the printing device 101 may be configured to scan the medium 201 by a single medium scanning unit 123 while being moved in either direction, or may have two medium scanning units 123 and may be configured to scan the medium 201 by one of the medium scanning units 123 according to the direction of movement. That is, the printing device 101 may have a medium scanning unit 123 scanning the area located in the +X direction in relation to the print head 121 while the printing device 101 is moved in the +X direction, and a medium scanning unit 123 scanning the area located in the −X direction in relation to the print head 121 while the printing device 101 is moved in the −X direction.

The medium scanning unit 123 may be configured to function as the movement detection signal output unit 125. Thus, the amount-of-movement calculation unit 147 can calculate the amount of movement of the printing device 101, using the image data of the medium 201 outputted from the medium scanning unit 123 as a movement detection signal. The amount-of-movement calculation unit 147 may also calculate the amount of movement of the printing device 101, using both the image data of the medium 201 outputted from the movement detection signal output unit 125 and the image data of the medium 201 outputted from the medium scanning unit 123 as a movement detection signal.

The mark detection unit 145 may be configured not to calculate the value of one of the three colors of RGB of the scanned data, according to the color of the mark 207 represented by the mark information. For example, the mark detection unit 145 may be configured not to calculate the value of "R" of the scanned data when the color of the mark 207 represented by the mark information is "R". Thus, the amount of calculation by the mark detection unit 145 can be reduced. Also, the scanning light source 135 may be configured not to cast light of a predetermined color according to the color of the mark 207 represented by the mark information. For example, the scanning light source 135 may be configured not to cast light of "R" when the color of the mark 207 represented by the mark information is "R".

The detection of the amount of movement by the movement detection signal output unit 125 is not limited to any particular method, provided that the movement detection signal output unit 125 can detect the amount of movement. Not only an optical method but also a mechanical method can be employed. That is, the movement detection signal output unit 125 may be configured to output a movement detection signal, based on the rotation of the roller 119 or a built-in sphere. Alternatively, the movement detection signal output unit 125 may detect the amount of movement, using another sensor such as an acceleration sensor. Also, a combination of a plurality of sensors may be used.

Figure 19:
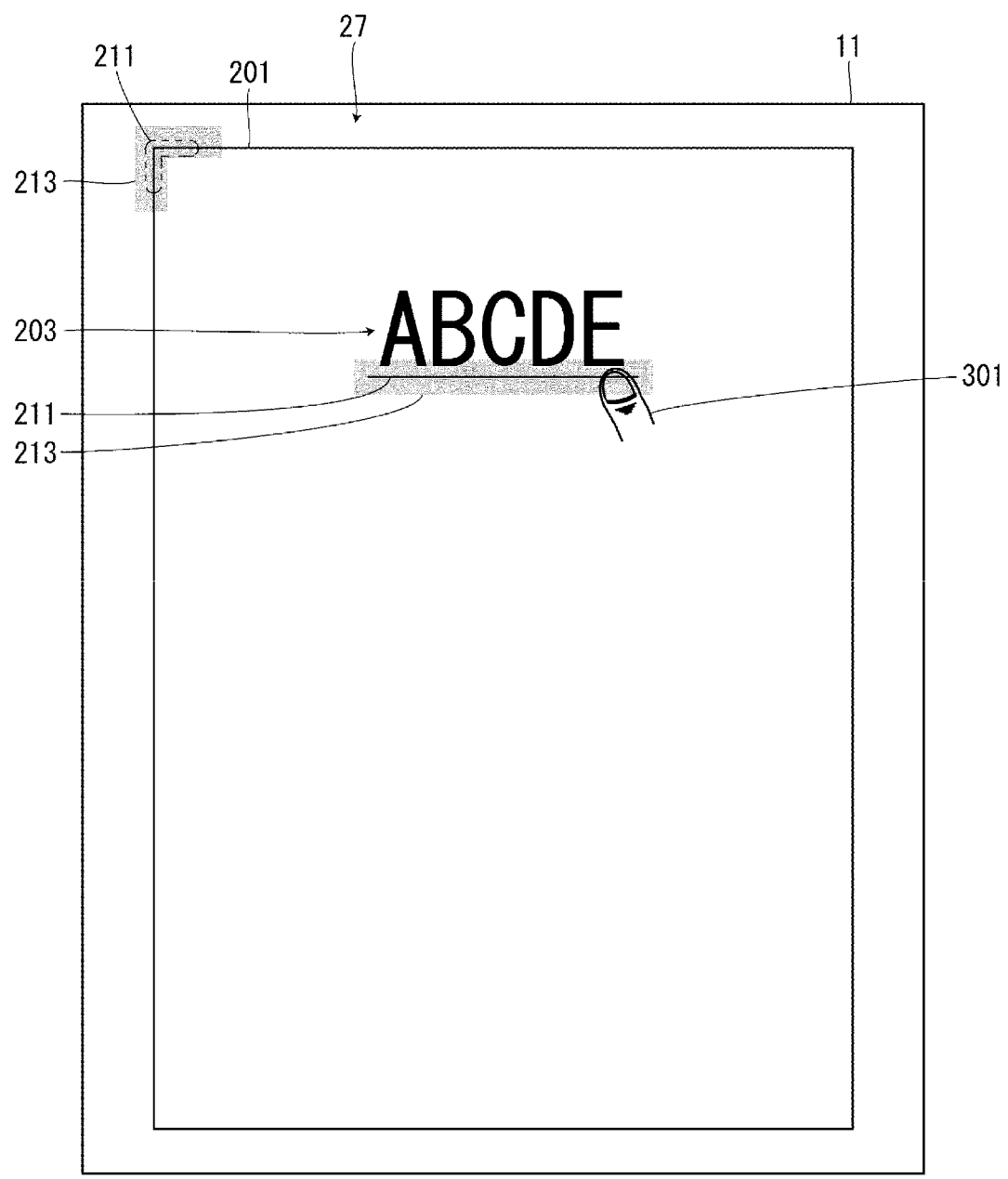
FIG. 19 shows a state where a user selects a mark candidate in a print preview.

The mark specifying unit 17 of the information processing device 1 may specify, as the mark 207, a mark candidate 211 selected by the user 301 from among a plurality of mark candidates 211 that are extracted, in the print preview 27. The user 301 selects a desired mark candidate 211 from among a plurality of mark candidates 211 by a touch operation on the processing-side display unit 11 formed of a touch panel, for example, as shown in FIG. 19. In this configuration, a mark candidate 211 desired by the user 301 can be specified as the mark 207 from among a plurality of mark candidates 211 that are extracted.

In the above embodiment, the information processing device 1 displays the print preview 27 to enable the user to make a change. However, printing may be performed in a default layout without displaying the print preview 27.

The head control unit 149 performs control for the print head 121 to print the print image 203 at a position based on the mark 207 as a reference point, via the correction of print data based on the relative position of the print head 121 to the mark 207 and the determination about whether the print head 121 has reached the printing start position based on the mark 207. However, this is not limiting. For example, the head control unit 149 may be configured to perform control for the print head 121 to print the print image 203 at a position based on the mark 207 as a reference point, via either the correction of print data based on the relative position of the print head 121 to the mark 207 or the determination about whether the print head 121 has reached the printing start position based on the mark 207.

The print head 121 is not limited to an inkjet head and may be, for example, a thermal head performing thermal transfer printing.

The printing device 101 is not limited to printing a letter or numeral and may also print a symbol or geometric shape such as a musical note on a five-line staff or may print a photograph in a plurality of paths.

Although printing based on the mark 207 is described above, a switching between a mode in which printing not based on the mark 207 and similar to the related art is performed and a mode in which printing based on the mark 207 may be allowed.

Supplementary Notes

Supplementary notes on the printing device, the program, and the method for producing a printed matter are given below.

A printing device printing on a medium while being manually moved in relation to the medium is provided. The printing device includes: a print information acquisition unit acquiring print data and mark information about a mark on the medium; a print head printing on the medium; a medium scanning unit scanning the medium; a mark detection unit detecting the mark represented by the mark information, based on scanned data, which is image data of the medium scanned by the medium scanning unit; and a head control unit controlling the print head in such a way that a print image based on the print data is printed at a position based on the mark that is detected, as a reference point.

In this configuration, the print image is printed at a position based on the mark as a reference point, even without the user accurately aligning the printing device with a planned printing position. Therefore, the print image can be printed at the planned printing position.

In this case, the print head may print on the medium while the printing device is moved in a first direction. The medium scanning unit may scan an area located further in the first direction than an available range of printing by the print head, on the medium.

In this configuration, during the movement of the printing device in the first direction, the mark is scanned by the medium scanning unit before the print head reaches the mark. Therefore, the printing device can print the print image nearer to the mark in the first direction than in a configuration where the medium scanning unit scans an area located in the direction opposite to the first direction in relation to the print head.

The +X direction is an example of the "first direction".

In this case, when projected in the first direction, the available range of printing may be located within an available range of scanning by the medium scanning unit.

In this configuration, the medium scanning unit can scan the mark located at substantially the same position as the position where the print image is printed in the second direction, while the printing device is moved in the first direction in relation to the medium.

The second outer surface 105 is an example of the "outer surface facing the medium". The Y-direction is an example of the "second direction".

In this case, the printing device may further include: a movement detection signal output unit outputting a movement detection signal when the printing device is moved; and an amount-of-movement calculation unit calculating an amount of movement of the printing device, based on the movement detection signal. The head control unit may control the print head, based on the amount of movement that is calculated.

In this configuration, the print image can be properly printed on the medium regardless of the speed at which the user moves the printing device.

In this case, the movement detection signal output unit may output image data of the medium that is scanned, as the movement detection signal. The movement detection signal output unit may scan the medium with a higher resolution than the medium scanning unit.

In this configuration, the amount-of-movement calculation unit can calculate the amount of movement of the printing device with precision, based on the high-resolution movement detection signal resulting from the scanning by the movement detection signal output unit.

In this case, the movement detection signal output unit may output image data of the medium that is scanned, as the movement detection signal. The medium scanning unit may scan the medium in multiple colors. The movement detection signal output unit may scan the medium in a single color.

In this configuration, the medium scanning unit can properly scan the mark regardless of the color of the mark. Also, the movement detection signal output unit can be formed inexpensively.

In this case, the medium scanning unit may function as the movement detection signal output unit.

In this configuration, the amount-of-movement calculation unit can calculate the amount of movement of the printing device, using the image data of the medium outputted from the medium scanning unit, as the movement detection signal.

In this case, the print head may have a plurality of nozzles and may eject ink from the plurality of nozzles to print.

In this configuration, the print image can be properly printed.

A program causes a processor provided in an information processing device that can communicate with a printing device printing on a medium while being manually moved in relation to the medium, to function as: a medium data acquisition unit acquiring medium data representing the medium; a print data acquisition unit acquiring print data; and a transmission unit transmitting the print data and mark information about a specified mark to the printing device in response to an instruction given by a user to print.

This configuration can provide the printing device with necessary information for printing a print image at a planned printing position.

The processing-side processor 3 is an example of the "processor".

In this case, the program may further cause the processor to function as: a display control unit causing a display unit to display a print preview including the medium based on the medium data and a print image based on the print data; and a mark specifying unit extracting a plurality of mark candidates that can be the mark, from the medium data, and specifying the mark from among the plurality of mark candidates that are extracted, based on a positional relationship between each mark candidate and the print image in the print preview.

In this configuration, the mark can be automatically specified from among the extracted mark candidates.

In this case, the program may further cause the processor to function as: a display control unit causing a display unit to display a print preview including the medium based on the medium data and a print image based on the print data; and a mark specifying unit extracting a plurality of mark candidates that can be the mark, from the medium data, and specifying, as the mark, a mark candidate selected by a user in the print preview from among the plurality of mark candidates that are extracted.

In this configuration, the mark candidate desired by the user can be specified as the mark, from among the extracted mark candidates.

In this case, the display control unit may highlight the plurality of mark candidates that are extracted, in the print preview.

This configuration can make the mark candidates more visible to the user.

In this case, the program may further cause the processor to function as a display control unit causing a display unit to display a print preview including the medium based on the medium data and a print image based on the print data. The display control unit may change a display position of the print image in relation to the medium in the print preview, based on an operation to change a position of the print image in relation to the medium.

In this configuration, the user can change the display position of the print image in relation to the medium in the print preview.

A method for producing a printed matter is provided. In the method, a printed matter is produced using a printing device printing on a medium while being manually moved in relation to the medium. The method includes causing the printing device to execute: acquiring print data and mark information about a mark provided on the medium; scanning the medium; detecting the mark represented by the mark information, based on scanned data, which is image data of the medium that is scanned; and printing a print image based on the print data at a position based on the mark that is detected, as a reference point, and thus producing the printed matter.

In this configuration, the print image is printed at a planned printing position, even without the user accurately aligning the printing device with a planned printing position. Therefore, a printed matter with the print image printed at the planned printing position can be easily produced.

What is claimed is:

1. A printing device printing on a medium while being manually moved in relation to the medium, the printing device comprising:
   a print head printing on the medium;
   a scanning image sensor scanning the medium; and
   a processor acquiring print data and mark information about a mark on the medium, the processor detecting the mark represented by the mark information, based on scanned data, which is image data of the medium scanned by the scanning image sensor, and the processor correcting the print data based on a relative position of the print head relative to the mark that is detected and controlling the print head to print a print image, based on the print data that is corrected, at a position based on the mark that is detected, wherein
   the print head prints on the medium while the printing device is moved in a first direction,
   the scanning image sensor scans an area located further in the first direction than an available range of printing by the print head, on the medium,
   when projected in the first direction, the available range of printing is located within an available range of scanning by the scanning image sensor, and
   the scanning image sensor has an overall length in a second direction that is longer than that of the print head in the second direction, the second direction being perpendicular to the first direction.

2. A printing device printing on a medium while being manually moved in relation to the medium, the printing device comprising:
   a print head printing on the medium;
   a scanning image sensor scanning the medium;
   a processor acquiring print data and mark information about a mark on the medium, the processor detecting the mark represented by the mark information, based on scanned data, which is image data of the medium scanned by the scanning image sensor, and the processor controlling the print head to print a print image, based on the print data, at a position based on the mark that is detected; and
   a detection image sensor outputting a movement detection signal when the printing device is moved, wherein
   the processor calculates an amount of movement of the printing device, based on the movement detection signal, and controls the print head, based on the amount of movement that is calculated.

3. The printing device according to claim 2, wherein
   the detection image sensor outputs image data of the medium that is scanned, as the movement detection signal, and
   the detection image sensor scans the medium with a higher resolution than the scanning image sensor.

4. The printing device according to claim 2, wherein
   the detection image sensor outputs image data of the medium that is scanned, as the movement detection signal,
   the scanning image sensor scans the medium in multiple colors, and
   the detection image sensor scans the medium in a single color.

5. The printing device according to claim 2, wherein
   the scanning image sensor functions as the detection image sensor.

6. A method for producing a printed matter in which a printed matter is produced using a printing device having a print head and printing on a medium while being manually moved in relation to the medium, the method comprising causing the printing device to execute:
   acquiring print data and mark information about a mark provided on the medium;
   scanning the medium;
   detecting the mark represented by the mark information, based on scanned data, which is image data of the medium that is scanned;
   acquiring a movement detection signal when the printing device is moved;
   calculating an amount of movement of the printing device, based on the movement detection signal; and
   printing a print image based on the print data at a position based on the mark that is detected by controlling the print head, based on the amount of movement that is calculated, and thus producing the printed matter.

* * * * *